(12) United States Patent
Schilder et al.

(10) Patent No.: US 12,398,791 B2
(45) Date of Patent: Aug. 26, 2025

(54) ELECTRIC DRIVE SYSTEM FOR A MOTOR VEHICLE

(71) Applicant: MERCEDES-BENZ GROUP AG, Stuttgart (DE)

(72) Inventors: Tobias Schilder, Ludwigsburg (DE); Tobias Haerter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/729,218

(22) PCT Filed: Jan. 13, 2023

(86) PCT No.: PCT/EP2023/050736
§ 371 (c)(1),
(2) Date: Jul. 16, 2024

(87) PCT Pub. No.: WO2023/135251
PCT Pub. Date: Jul. 20, 2023

(65) Prior Publication Data
US 2025/0116317 A1    Apr. 10, 2025

(30) Foreign Application Priority Data
Jan. 17, 2022   (DE) .................. 10 2022 000 141.1

(51) Int. Cl.
*F16H 37/08*   (2006.01)
*B60K 1/00*    (2006.01)
(Continued)

(52) U.S. Cl.
CPC ............. *F16H 37/082* (2013.01); *B60K 1/00* (2013.01); *B60K 17/02* (2013.01); *F16H 57/021* (2013.01);
(Continued)

(58) Field of Classification Search
CPC .................. B60K 2001/001; B60K 17/12; B60K 17/165; B60K 17/02; F16H 2057/02052
See application file for complete search history.

(56) References Cited

U.S. PATENT DOCUMENTS 7,867,125 B2 * 1/2011 Kim .................... B60K 17/046
475/221
9,033,839 B2   5/2015 Rossey et al.
(Continued)

FOREIGN PATENT DOCUMENTS

DE   102013225519 A1   6/2015
DE   102016215010 A1   2/2018
(Continued)

OTHER PUBLICATIONS

International Search Report and Written Opinion mailed May 2, 2023 in related/corresponding International Application No. PCT/EP2023/050736.
(Continued)

*Primary Examiner* — Huan Le
(74) *Attorney, Agent, or Firm* — PATENT PORTFOLIO BUILDERS PLLC

(57) ABSTRACT

An electric drive system for a motor vehicle, includes a housing, an electric motor with a rotor rotationally connected with a rotor shaft, a planetary gearset, and an axle drive. The planetary gearset includes exactly one sun gear and exactly one planetary carrier. The rotor shaft is connected in a rotationally fixed manner with the sun gear. The electric drive system includes a coupling element operating in at least one direction of rotation in a form-fitting manner and is provided between the planetary carrier and an input shaft of the axle drive, by means of which coupling element the planetary carrier is coupled or can be coupled with the input shaft in such a way that a rotationally fixed connection between the planetary carrier and the input shaft can be produced at least in a forward direction of rotation of the rotor.

8 Claims, 1 Drawing Sheet

Figure 1:
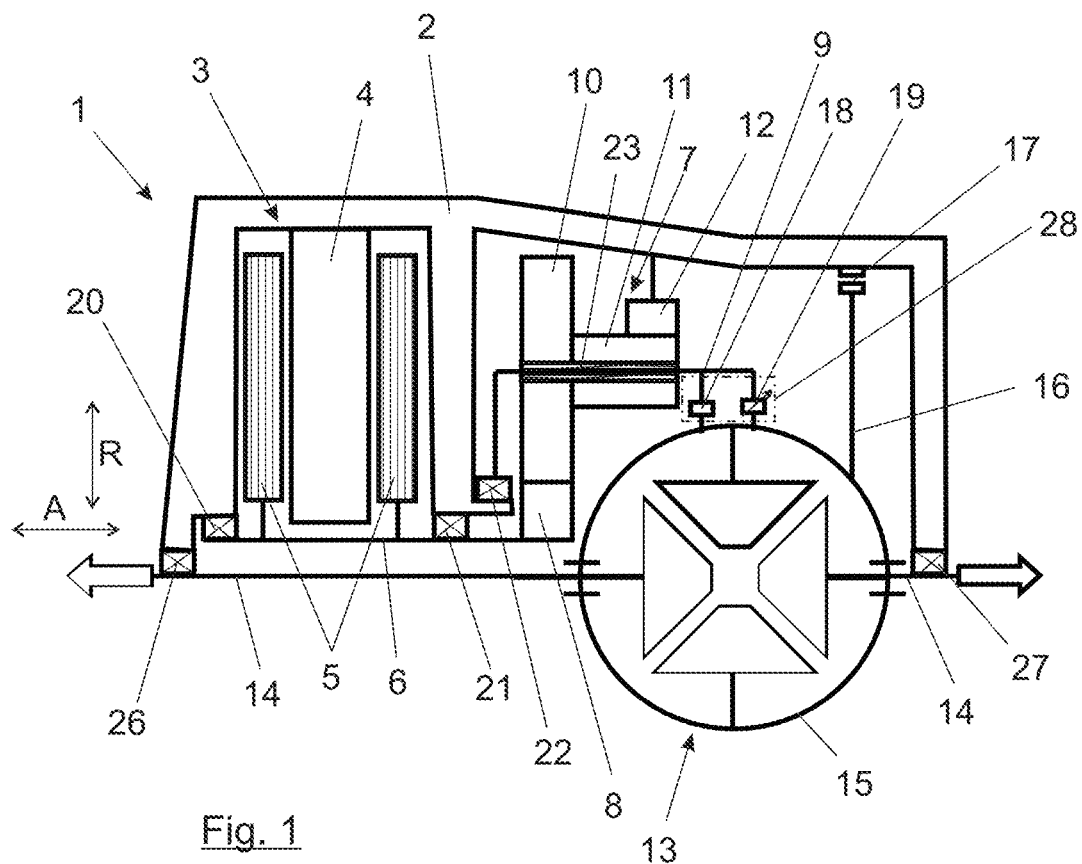

(51) Int. Cl.
*B60K 17/02* (2006.01)
*F16H 57/02* (2012.01)
*F16H 57/021* (2012.01)
*F16H 63/34* (2006.01)

(52) U.S. Cl.
CPC .... *F16H 63/3416* (2013.01); *B60K 2001/001* (2013.01); *F16H 2057/02034* (2013.01); *F16H 2057/02052* (2013.01)

(56) References Cited

U.S. PATENT DOCUMENTS

| | | | |
|---|---|---|---|
| 10,024,430 | B2 | 7/2018 | Spooner et al. |
| 11,524,574 | B2 | 12/2022 | Grimminger |
| 11,845,330 | B2 * | 12/2023 | Yoo ........................ B60K 17/16 |
| 2012/0149520 | A1 | 6/2012 | Schneidewind et al. |
| 2024/0227548 | A1 * | 7/2024 | Oota ...................... B60K 17/16 |

FOREIGN PATENT DOCUMENTS

| | | |
|---|---|---|
| DE | 102017004898 A1 | 11/2018 |
| DE | 102018111798 A1 | 11/2019 |
| DE | 102020200137 B3 | 5/2021 |
| DE | 102020000664 A1 | 8/2021 |
| DE | 102020109112 A1 | 10/2021 |
| EP | 1142743 B1 | 1/2011 |

OTHER PUBLICATIONS

Office Action created Aug. 22, 2022 in related/corresponding DE Application No. 10 2022 000 141.1.

* cited by examiner

ELECTRIC DRIVE SYSTEM FOR A MOTOR VEHICLE

BACKGROUND AND SUMMARY OF THE INVENTION

Exemplary embodiments of the invention relate to an electric drive system for a motor vehicle, having a housing, an electric motor, a planetary gearset, and an axle drive.

A generic electric drive system for a vehicle is essentially known from DE 10 2013 225 519 A1. Herein, a structure having an electric motor, a planetary gearset, and an axle drive is described, wherein the planetary gearset has a planetary carrier with two planetary gears coupled in a rotationally fixed manner for each of the planets. The planetary gears mesh with two different ring gears that can be locked by braking elements with respect to a housing of the electric drive system. Therefore, two different transmission ratios are realized between the electric motor on the one hand and the axle drive on the other hand.

The disadvantage of the two-speed system described above lies, in particular, in these switching and braking elements for the two planetary gears. These have to be designed as a multiple-disc switching elements, which leads to increased losses in coasting mode, i.e., when the vehicle is in sailing mode. Ultimately, this causes a higher power demand of the vehicle and reduces the range of the vehicle.

US 2012/0 149 520 A1 also discloses a very similar structure. The structure is also switched between two different ring gears, whereby a claw switching element can be provided for switching between the ring gears.

Further electric drive systems are known from U.S. Pat. No. 9,033,839 B2, EP 1 142 743 B1, U.S. Pat. No. 10,024,430 B2, DE 10 2020 109 112 A1 and the generic DE 10 2020 200 137 B3.

Exemplary embodiments of the present invention are directed to an improved electric drive system which in particular avoids or at least reduces the mentioned disadvantages.

The electric drive system according to the invention comprises, similar to the drive system in the above-mentioned prior art, an electric motor, the rotor shaft of which is connected on the one hand in a rotationally fixed manner with the rotor of the electric motor, and on the other hand is connected in a rotationally fixed manner with the exactly one sun gear of the planetary gearset.

It is understood that the planetary carrier carries a set of first planetary gears and a set of second planetary gears, wherein the first planetary gears have a larger diameter than the second planetary gears and wherein each one of the first planetary gears and each one of the second planetary gears are connected with each other in a rotationally fixed manner. In this case, the sun gear can engage with the first planetary gears.

Furthermore, a ring gear, which is connected with the housing in a rotationally fixed manner, is connected with the second planetary gears. Due to the different diameters of the planetary gears, a correspondingly high transmission ratio of the planetary gearset between the electric motor and the input shaft of the axle drive can be achieved very efficiently and with minimum installation space requirements.

Here, "connected in a rotationally fixed manner" in the context of the present invention means that the elements or components coupled with each other in a rotationally fixed manner are connected with each other in such a way that they rotate at the same angular velocity. The elements or components connected in this rotationally fixed manner are necessarily arranged coaxially to each other for this purpose.

According to the invention, a coupling element operating in at least one direction of rotation in a form-fitting manner is provided, which is arranged between the planetary carrier and an input shaft of the axle drive. By means of this coupling element, the planetary carrier is coupled or can be coupled with the input shaft in such a way that a rotationally fixed connection between the planetary carrier and the input shaft can be produced at least in a forward direction of rotation of the rotor. This coupling element can be used to transmit power via the coupling element to the input shaft of the axle drive and thus ultimately to the wheels of the motor vehicle driven by the axle drive for towing operation, i.e., when the motor vehicle is to be driven via the electric motor in its motorized mode.

Further according to the invention, a first radial bearing is provided, by means of which the planetary carrier is supported radially relative to the housing, wherein a bearing half of the first radial bearing on the planetary carrier side is arranged radially outside of a second bearing half on the housing side. The planetary carrier is supported via the first radial bearing from radially outside on an axially projecting collar of an intermediate housing wall arranged radially further inwards.

Further according to the invention, a second radial bearing is provided, by means of which the planetary carrier is supported radially relative to the axle drive, wherein here the first bearing half of the second radial bearing on the planetary carrier side is arranged radially outside of a second bearing half on the axle drive side. The support is therefore provided by a planetary carrier supported externally on the axle drive. The second bearing half of the second radial bearing can preferably be supported on the input shaft of the axle drive. In the bevel gear differential design mentioned above, this bearing half of the second radial bearing would then be supported accordingly on the differential cage.

The "forward direction of rotation" is initially to be understood as one of two possible directions of rotation of the rotor, in particular, the "forward direction of rotation" is to be understood as a direction of rotation of the rotor that is intended for forward operation of the motor vehicle. The term "towing operation" refers to an operation of the electric motor in which a drive torque generated by the electric motor is transmitted from the electric motor to the axle drive for the purpose of driving the motor vehicle.

According to an extraordinarily favorable further development, the coupling element can have a first freewheel. The first freewheel is provided between the planetary carrier and an input shaft of the axle drive, by means of which the planetary carrier is coupled with the input shaft in such a way that a rotation of the planetary carrier relative to the input shaft is blocked in a forward direction of rotation of the rotor of the electric motor. Only traction torques of the electric motor can be transmitted via the first freewheel between the ring gear and the housing. Automatic decoupling occurs in overrun mode and automatic recoupling occurs when switching again from overrun mode to traction mode.

The design is extraordinarily simple and efficient and can therefore provide, without the need for an actuator, that the electric motor can transmit torque to the axle drive in the forward direction of rotation. In a backward direction of rotation, i.e., when the power flows from the axle drive in the direction of the electric motor, the latter does not need to be dragged along however, but together with the entire planetary gearset is independently decoupled via the first freewheel, so that sailing is possible without additional power losses in the region of the electric drive system, which increases the overall performance and efficiency of the electric drive system. This results in a greater range for a vehicle equipped with such an electric drive system as the main drive or additional drive.

Due to the decoupling in overrun mode via the first freewheel, no reverse travel and no recuperation is possible. According to an extraordinarily favorable further development of this design of the electric drive system according to the invention, it can therefore be provided that the coupling element has a second freewheel, which is arranged between the planetary carrier and the input shaft, by means of which the planetary carrier is coupled to the input shaft of the axle drive in such a way that a rotation of the planetary carrier relative to the input shaft is blocked counter to the forwards direction of rotation of the rotor. This second freewheel now operates in overrun mode and not traction mode. In traction mode, the electric motor acts on the axle drive via the first freewheel, which opens in overrun mode. At the same time, a connection is established in overrun mode via the second freewheel, which opens automatically in traction mode, so that both reversing and recuperation are possible.

In order not to lose the above-mentioned advantage of loss-free or low-loss sailing, the second freewheel is designed to be switchable. In the context of the invention, switchable means that the freewheel can be switched on and off. When switched on, it then acts like a non-switchable freewheel. It therefore blocks rotation in one direction and allows free rotation in the opposite direction. When switched off, the blockage is then lifted, the freewheel is thus deactivated and the connection can rotate freely in both directions of rotation. By switching off the second freewheel, the blockage caused by it in overrun mode can be released, so that loss-free sailing with a motor vehicle equipped with the electric drive system is still possible in overrun mode. If recuperation is now required or reversing is necessary, such operation can be easily and efficiently enabled by switching the second freewheel so that its blocking function is switched on again.

As an alternative to such a design with one or two freewheels, one of which is switchable, it can also be provided that the coupling element has a claw switching element having at least two switching positions. The planetary carrier and the input shaft of the axle drive can then be connected in a first switching position in a rotationally fixed manner via this claw switching element, so that a rotationally fixed connection can be realized for both overrun and traction operation. This enables both forwards as well as backwards travel or recuperation when braking the motor vehicle with regenerative operation of the electric motor. In the second switching position of this claw switching element, the input shaft of the axle drive and the planetary carrier are then released from each other so that sailing is possible without the electric motor and the planetary gear having to be dragged along. This enables extremely energy-efficient sailing and, thanks to the use of the claw switching element, allows simple and efficient switching, which does not cause any losses when the claw switching element is open, as would be the case with the multiple-disc switching elements, for example.

A further very favorable embodiment of this variant of the drive system according to the invention with the claw switching element further provides that the claw switching element has a third switching position, in which the input shaft of the axle drive can be connected with the housing in a rotationally fixed manner. This position would then represent a parking lock position in which the input shaft of the axle drive is connected to the housing of the electric drive system in a rotationally fixed manner, so that the axle drive and the wheels of the vehicle cannot rotate.

Alternatively, the electric drive system according to the invention can also provide a park gear and a switching element, via which the input shaft of the axle drive can be connected to the housing in a rotationally fixed manner in order to realize a parking lock state. This variant with the park gear could be implemented accordingly both in the embodiment of the coupling element with one or two freewheels and in the embodiment of the coupling element with a claw switching element.

According to a further highly advantageous embodiment of the electric drive system according to the invention, it can be provided that the second planetary gears are arranged axially overlapping with the axle drive. Such an arrangement axially overlapping with the axle drive, so that the second planetary gears are at least partially located within the same area when viewed in the axial direction of the electric drive system, enables a very compact design in the axial direction.

For the purposes of the present invention, the axial direction should always be understood as the axial direction along or parallel to the main axis of rotation of the electric drive system, in this case parallel to the axis of rotation of the rotor shaft. The radial direction as described here is perpendicular to this axial direction.

A further extraordinarily favorable embodiment of the electric drive system can provide that the axle drive has a bevel gear differential with a differential cage. This differential cage, which can also be referred to as differential housing, thus forms the differential input shaft. Particularly with this axle drive design, the axial overlap with the second planetary gears, i.e., the smaller diameter planetary gears on the planet carrier, can achieve a particular installation space advantage.

According to an extraordinarily favorable further development of the electric drive system according to the invention, the rotor shaft can be supported via combination bearings, for which purpose a first combination bearing and a second combination bearing are provided, which are each set up to provide axial and radial support of the rotor shaft relative to the housing. In the case of both the first combination bearing and the second combination bearing, the respectively associated bearing half on the rotor shaft side is arranged radially within the respective bearing half on the housing side. The rotor shaft is therefore supported on parts of the housing, e.g., radially extending intermediate walls of the housing, which lie radially outside the rotor shaft.

The electric motor can preferably be realized as an axial flux motor.

Further advantageous embodiments of the electric drive system can also be seen in the exemplary embodiments, which are shown in more detail below with reference to the figure.

BRIEF DESCRIPTION OF THE DRAWING FIGURES

Figure 2:
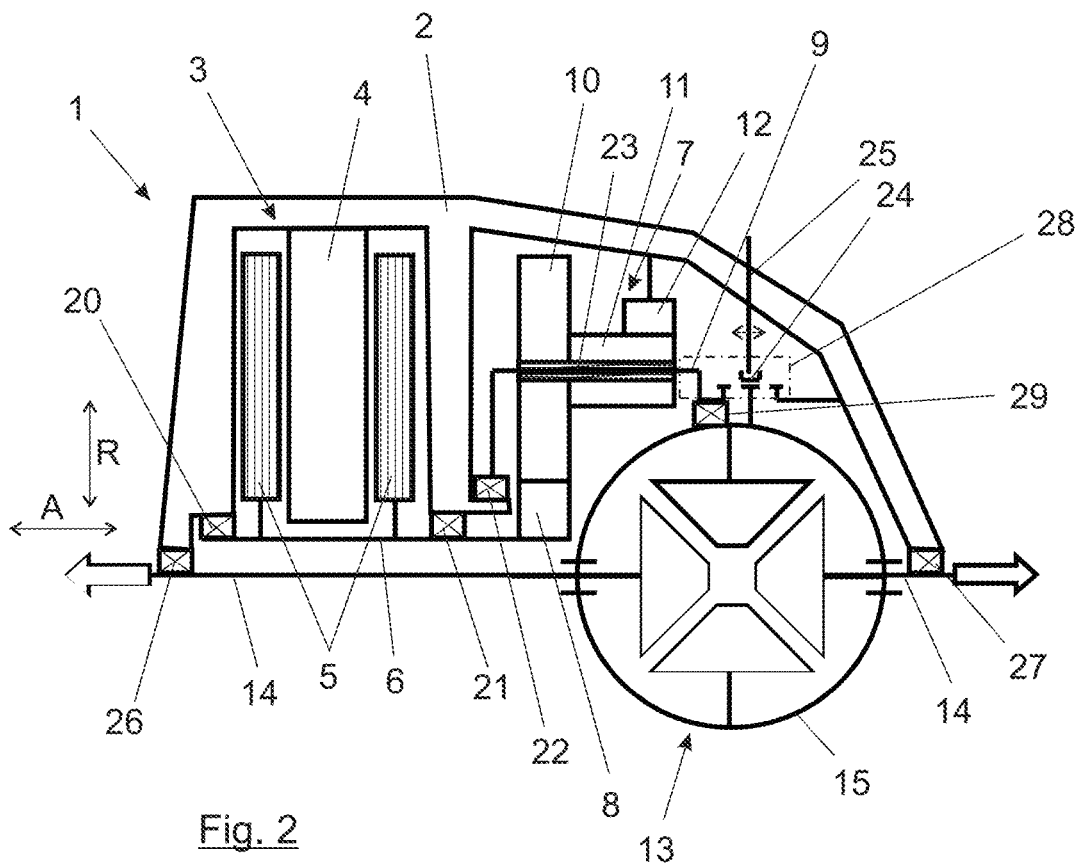

Here:

FIG. 1 shows a first possible embodiment of an electric drive device according to the invention; and FIG. 2 shows a second possible embodiment of an electric drive device according to the invention.

DETAILED DESCRIPTION

FIG. 1 shows a schematic representation of an electric drive system 1 for a motor vehicle (not illustrated). The electric drive system 1 comprises a housing 2 and an electric motor 3 with a stator 4 that is held in a rotationally fixed manner relative to the housing 2 and a rotor 5 that can rotate relative to the stator 4 and is in turn connected in a rotationally fixed manner to a rotor shaft 6.

The electric drive system 1 also comprises a planetary gearset 7 with a sun gear 8, which is connected in a rotationally fixed manner to the rotor shaft 6, and a planet carrier 9, which carries a set of first planetary gears 10 and a set of second planetary gears 11. In this case, the first planetary gears 10 have a greater diameter than the second planetary gears 11. The adjacent first and second planetary gears 10, 11 are each coupled to each other in a rotationally fixed manner. The second planetary gears 11, which have a smaller diameter than the first planetary gears 10, mesh with a ring gear 12 of the planetary gearset 7. This ring gear 12 is fixed against rotation in relation to the housing 2.

In addition, the electric drive system 1 has an axle drive 13, which is designed here as a bevel gear differential. An output shaft 14 of the axle drive 13 forms the output drive indicated by the arrows, in particular for the wheels of the motor vehicle. The differential cage 15 forms the input shaft 15 of the axle drive 13 and is coupled or can be coupled to the planetary carrier 9 in a manner described in more detail later. The differential cage 15 can also be fixed against rotation relative to the housing 2 via a park gear 16 and a corresponding switching element 17 in order to realize a parking lock for the motor vehicle.

The design shown here with the one ring gear 12 of the planetary gearset 7 therefore ultimately represents a single-speed system for driving or at least partially driving the motor vehicle via the electric drive system 1.

A coupling element 28 operating in at least one direction of rotation in a form-fitting manner is now arranged between the differential cage 15 as the input shaft 15 of the axle drive 13 and the planetary carrier 9 and is outlined here by a dotted line. In the embodiment shown in FIG. 1 of the electric drive system 1, this coupling element 28 comprises a first freewheel 18 and a second switchable freewheel 19.

The first freewheel 18 only transmits traction torques of the electric motor 3 to the output drive shaft 14, while in overrun mode the first freewheel 18 automatically turns freely and thus decouples the electric motor 3 and the planetary gearset 7 from the axle drive 13. This enables an overrun mode without dragging the electric motor 3 and the planetary gearset 7, which enables efficient and low-loss operation of the electric drive device 1 during so-called sailing, i.e., when the motor vehicle is allowed to roll without drive. If a change is made from overrun to traction mode again, the first freewheel 18 closes automatically and the torque of the electric motor 3 can be transmitted to the output drive 14 again.

With the first freewheel 18 alone, it would not be possible to realize recuperation, nor would it be possible to reverse the vehicle via the electric motor 3, as this would require power transmission between the output drive 14 and the electric motor 3 in the opposite direction, i.e., the direction of overrun. To make this possible, the second freewheel 19 is now provided. This freewheel 19 is designed in such a way that it can transmit torques in overrun mode but not in traction mode. It therefore supplements the first freewheel 18 accordingly, so that recuperation and reversing are now possible. This second freewheel 19 is switchable. By switching this second freewheel 19, which is indicated by the arrow in the illustration in FIG. 1, the blocking function can be switched on or off, so that the second freewheel 19 either operates as a freewheel 19 blocking in overrun mode as described or can be switched to a freewheel 19 that is released in both overrun and traction mode, so that, depending on the switching position of this second freewheel 19, either recuperation or reversing is possible, while sailing is possible without the electric engine 3 being dragged along when the blocking function is switched off.

The combination of the two freewheels 18, 19, of which the second freewheel 19 is switchable, therefore enables a permanent connection in one direction and a switchable connection in the other direction of rotation or force. The two freewheels 18, 19 can preferably be brought together as an integrated coupling element 28, which is arranged in particular in the radial direction R outside the differential cage 15 but axially overlapping with the latter. The structural unit is preferably easily accessible from the outside of the housing 2, in particular in order to be able to actuate the switching actuator of the second freewheel 19 easily and efficiently, for example by means of a hydraulic line, an electrical signaling line and/or similar.

Overall, the design can be realized in an extremely compact way. It is not only the coupling element 28 with the two freewheels 18, 19 that can be designed to overlap the axle drive 13 or its differential cage 15 in the axial direction A of the output drive shaft 14 or the rotor shaft 6, but in particular also the set of second planetary gears 11 and preferably the ring gear 12. All this results in a very compact design, especially in the axial direction A.

The electric motor 3, which can be designed in particular as an axial flux motor, can be supported on the housing 2 with respect to its rotor shaft 6 via a first combination bearing 20 and a second combination bearing 21, wherein the rotor shaft 6 is arranged radially inside and the housing is arranged radially outside the two combination bearings 20, 21. The combination bearings can transmit both axial and radial forces, i.e., they are a combination of axial and radial bearings. In particular, these can be angular contact ball bearings, four-point contact ball bearings or similar.

The planetary carrier 9 of the planetary gearset 7 can then also be supported on the housing 2 via a first radial bearing 22, whereby the housing 2 is arranged radially inside and the planet carrier 9 is arranged radially outside this first radial bearing 22. The radial bearing 22 can be designed, in particular, as a cylindrical roller bearing or deep groove ball bearing, as is generally known and customary. The planets 10, 11 are mounted on the planet carrier via a further radial bearing 23 in a manner known per se.

Further relevant bearing points in the structure of the electric drive system 1 are now located in the area of the output drive shaft 14, wherein a radial bearing 26 is arranged on the left in the illustration of FIG. 1 and a combination bearing 27, which can therefore transmit axial and radial forces, is arranged on the right in the illustration of FIG. 1. In these bearings, the radially inner output drive shaft 14 is supported on the radially outer housing 2.

An alternative exemplary embodiment of the electric drive system 1 can now be seen in the illustration in FIG. 2. Identical components are labelled with the same reference symbols and are not explained again below. Its design is comparable to the content discussed in relation to the previous exemplary embodiment. The difference now lies in the fact that the coupling element 28 has a claw switching element 24 instead of the two freewheels 18, 19. This claw switching element 24 can now be switched to various switching positions, in particular from outside the housing 2 via an actuator 25, which is only indicated here as a line. In the exemplary embodiment shown in FIG. 2, these are three discrete switching positions. The center switching position shown in FIG. 2 is a neutral position in which the claw switching element 24 is only connected to the differential cage 15 as the input shaft 15 of the axle drive 13. This can therefore rotate freely, which is typically referred to as the neutral position or colloquially as "idling".

If the claw switching element 24 is now shifted to the left in the illustration in FIG. 2, it connects the planetary carrier 9 with the differential cage 15 as the input shaft 15 of the axle drive 13. This creates a rotationally fixed connection between the input shaft 15 of the axle drive 13 and the planetary carrier 9. This rotationally fixed connection acts in both the traction and overrun directions, so that forces are transmitted in both directions via the claw switching element 24 when the rotationally fixed connection is activated. In this switching position, it is therefore possible both to drive the output drive shaft 14 and to drive the electric motor via the output drive shaft 14, which then acts as a generator to recover energy when the motor vehicle brakes. In addition to this so-called recuperation, it is also possible to reverse the motor vehicle by rotating the electric motor in the opposite direction and thus transmitting power to the output drive shaft 14 in the direction of overrun.

In order to be able to realize energy-efficient sailing of the motor vehicle, the claw switching element 23 is simply switched back to its neutral position via the actuator 25, as shown in the illustration in FIG. 2. This means that low-loss sailing can be achieved without dragging the electric motor 3 and the planetary gearset 7.

As already mentioned, the claw switching element 24 in the illustration in FIG. 2 has a third switching position. In this third switching position, the claw switching element 24 is moved to the right by the actuator 25 in the illustration in FIG. 2. It then connects the input shaft 15 of the axle drive 13 to the housing 2 of the electric drive system 1 so that it cannot rotate. This allows a parking lock function to be realized because the input shaft 15 is now held in a rotationally fixed position relative to the gearbox and therefore the output drive shaft 14 cannot rotate.

Of course, instead of embodying the claw switching element 24 with three switching positions, it would also be conceivable to realize it with only two switching positions, in the illustration of FIG. 2 the neutral position and the left-hand position for connecting the planetary carrier 9 to the input shaft 15. In order to still be able to realize a parking lock, the park gear 16 with its switching element 17 could now be integrated into the design of FIG. 2 in the same way as shown in FIG. 1. Naturally, this would also be conceivable the other way round, in order to use the intermediate element extending in axial direction A instead of the park gear with its extension in radial direction R, which intermediate element in turn could then be held against rotation relative to the housing via the switching element 17.

In addition to the bearings already described, a second radial bearing 29 can be seen in the illustration in FIG. 2. This radial bearing 29 is formed between the planetary carrier 9 and the differential cage 15 as the input shaft 15 of the axle drive 13, with its bearing half on the planetary carrier side being arranged radially on the outside and its bearing half on the axle drive side being arranged radially on the inside. The planetary carrier 9 is therefore supported on the differential cage 15 from the outside via this second radial bearing 29. This second radial bearing 29 would of course also be possible in the design shown in FIG. 1, even if it is not shown there to simplify the illustration.

Furthermore, with regard to the actuator 25, the arrangement axially overlapping and radially outside the differential cage 15 is of course also advantageous here, so that this is comparatively easy to access from outside the housing 2, as has already been described above for an actuator system of the second switchable freewheel 19.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. An electric drive system for a motor vehicle, the electric drive system comprising:
    a housing;
    an electric motor comprising a rotor connected in a rotationally fixed manner with a rotor shaft;
    a planetary gearset;
    an axle drive, wherein the planetary gearset comprises exactly one sun gear and exactly one planetary carrier, wherein the rotor shaft is connected in a rotationally fixed manner with the exactly one sun gear, wherein the exactly one planetary carrier carries a set of first planetary gears and a set of second planetary gears, wherein the first planetary gears have a larger diameter than the second planetary gears, wherein each one of the first planetary gears and each one of the second planetary gears are connected with each other in a rotationally fixed manner, wherein the exactly one sun gear engages with the first planetary gears;
    exactly one ring gear, which is coupled with the housing in a rotationally fixed manner, and which meshes with the second planetary gears;
    a coupling element configured to operate in at least one direction of rotation in a form-fitting manner and arranged between the exactly one planetary carrier and an input shaft of the axle drive, wherein the coupling element is configured to couple the exactly one planetary carrier with the input shaft such that a rotationally fixed connection between the exactly one planetary carrier and the input shaft is produced at least in a forward direction of rotation of the rotor;
    a first radial bearing configured to radially support the exactly one planetary carrier relative to the housing, wherein a bearing half of the first radial bearing on the exactly one planetary carrier side is arranged radially outside of a second bearing half on the housing side, wherein the exactly one planetary carrier is supported via the first radial bearing from radially outside on an axially projecting collar of an intermediate housing wall arranged radially further inward; and
    a second radial bearing configured to radially support the exactly one planetary carrier relative to the axle drive, wherein a first bearing half of the second radial bearing on the exactly one planetary carrier side is arranged radially outside of a second bearing half on an axle drive side, wherein the second bearing half of the second radial bearing is supported on the input shaft of the axle drive.

2. The electric drive system of claim 1, wherein the coupling element has a first freewheel between the exactly one planetary carrier and the input shaft of the axle drive, wherein the first freewheel is configured to couple the exactly one planetary carrier with the input shaft such that a rotation of the exactly one planetary carrier relative to the input shaft is blocked in a forward direction of rotation of the rotor.

3. The electric drive system of claim 2, wherein the coupling element has a second freewheel between the exactly one planetary carrier and the input shaft, wherein the second freewheel is switchable, and wherein the second freewheel is configured to couple the exactly one planetary carrier with the input shaft such that a rotation of the exactly one planetary carrier relative to the input shaft is blocked counter to the forward direction of rotation of the rotor in a switched-on state.

4. The electric drive system of claim 1, wherein the coupling element has a claw switching element having at least two switching positions, wherein the claw switching element is configured to connect the exactly one planetary carrier and the input shaft of the axle drive in a first switching position in a rotationally fixed manner, and to release the exactly one planetary carrier and the input shaft of the axle drive from each other in a second switching position.

5. The electric drive system of claim 4, wherein the claw switching element has a third switching position, in which the input shaft is connected with the housing in a rotationally fixed manner.

6. The electric drive system of claim 1, wherein the input shaft of the axle drive is connected via a park gear and a switching element with the housing in a rotationally fixed manner.

7. The electric drive system of claim 1, further comprising:
a first combination bearing; and
a second combination bearing,
wherein the first and second combination bearings are configured to provide axial and radial support of the rotor shaft relative to the housing, wherein in both the first combination bearing and in the second combination bearing, a respectively associated bearing half on the rotor shaft side is arranged radially within a respective bearing half on the housing side.

8. The electric drive system of claim 1, wherein the electric motor is an axial flux motor.

* * * * *